Sept. 11, 1934. P. S. SHIELD 1,973,115
SELECTIVE VALVE OPERATING APPARATUS
Filed Feb. 29, 1932 3 Sheets-Sheet 1

Sept. 11, 1934.  P. S. SHIELD  1,973,115
SELECTIVE VALVE OPERATING APPARATUS
Filed Feb. 29, 1932  3 Sheets-Sheet 2

Sept. 11, 1934. P. S. SHIELD 1,973,115
SELECTIVE VALVE OPERATING APPARATUS
Filed Feb. 29, 1932    3 Sheets-Sheet 3
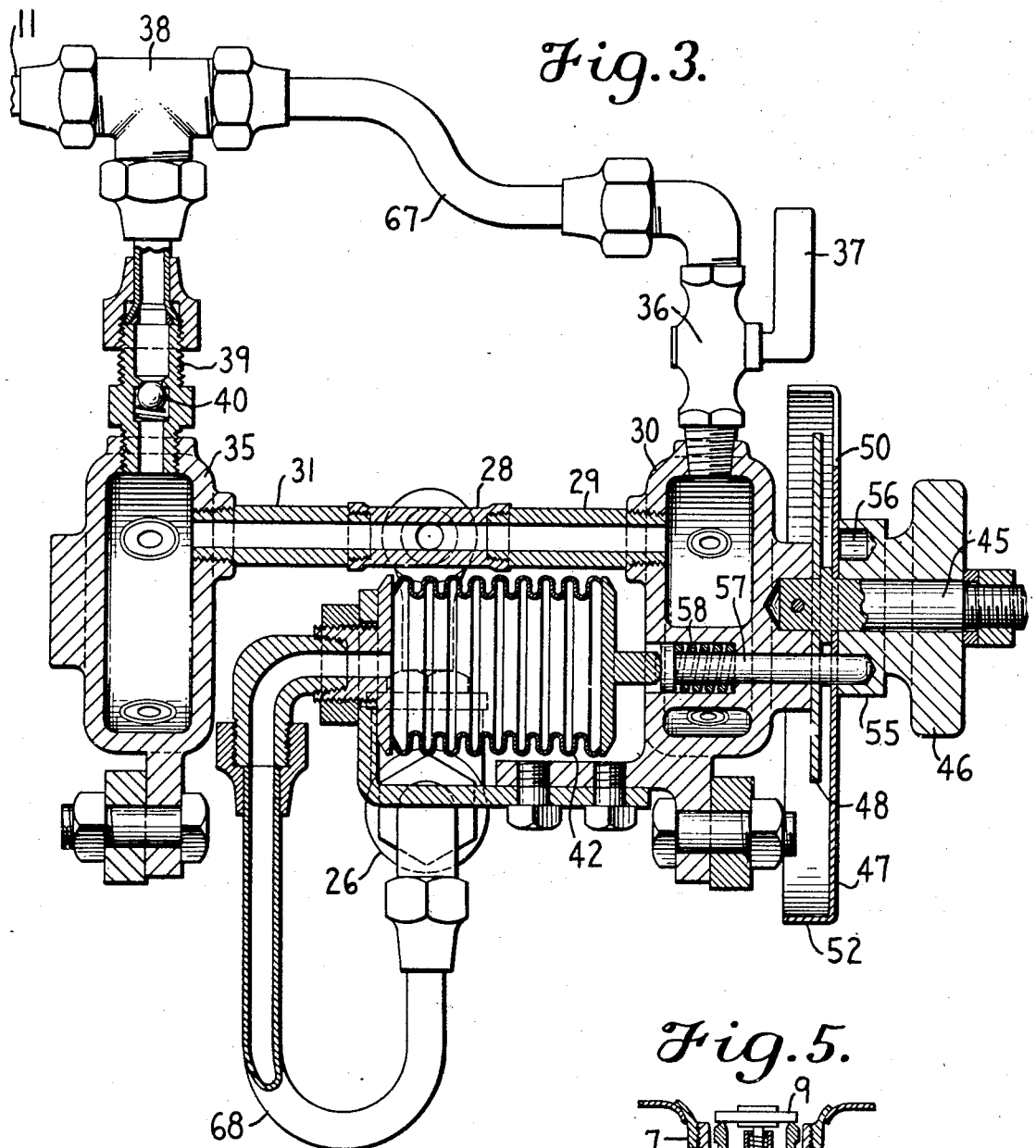
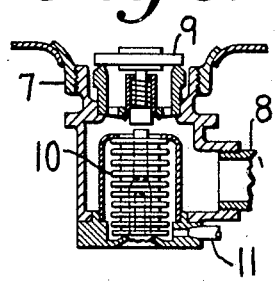
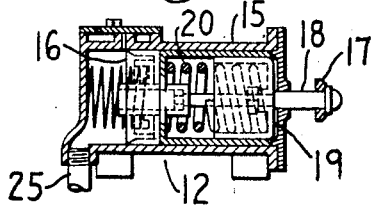

Patented Sept. 11, 1934

1,973,115

UNITED STATES PATENT OFFICE 1,973,115

SELECTIVE VALVE OPERATING APPARATUS

Paul S. Shield, Cincinnati, Ohio, assignor to Augustine Davis, Jr., Cincinnati, Ohio Application February 29, 1932, Serial No. 595,839

13 Claims. (Cl. 137—21)

The object of this invention is to provide an advantageous selective fluid-control system for operating any one of a plurality of valves, more especially the outlet or safety valves of the compartments of a multiple compartment truck tank. In the embodiment of the invention herein illustrated, the apparatus is hydraulic, that is to say, operating with an incompressible fluid; however, other fluids may be used with appropriate modification and it will be evident that the invention is not limited to the use of pressures above that of the atmosphere.

The invention comprises a combination, and subcombinations, of parts, designed for easy operation, and to insure that only one valve will be operated, or only one compartment will be discharged, at a time.

In the accompanying drawings, forming part hereof:

Fig. 3 is a section on the angular line 3—3 of Fig. 2;

Fig. 4 is a section through an hydraulic operator; and

Fig. 5 is a section through one of the fluid-operated tank valves.

In the illustrated embodiment:

Figure 1:
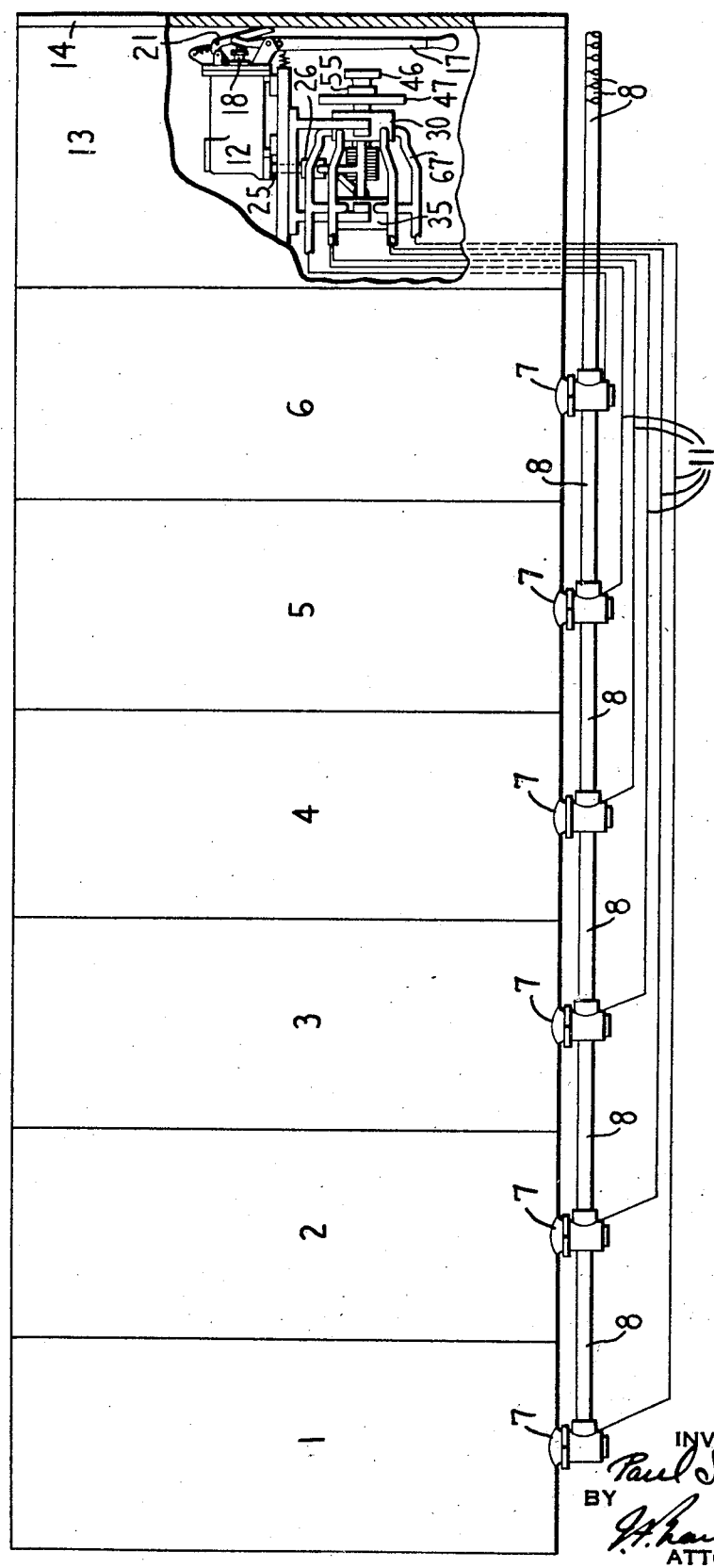
Fig. 1 is a side elevation of a multiple compartment truck tank, with a control box broken away to show parts within, the control system being illustrated schematically.

Fig. 1 represents a truck tank having separate compartments numbers 1 to 6. Each compartment has a bottom outlet 7, pipes 8 extending from them to the rear of the tank, where there are usually faucets. Each outlet is normally closed by a valve 9 (closed by spring, gravity and/or liquid head). The valve can be opened by bellows devices 10, or their equivalents, which may be termed servo-motors.

Individual small pipe lines 11 lead to the respective servo-motors, that is to say, the fluid-pressure actuated devices of the several valves. Application of an abnormal fluid pressure condition to these devices opens the valves, release of the pressure condition causes or permits them to close.

A fluid-pressure operator 12 is associated with the tank, that is to say, with a collection of valves to be operated. Here it is shown housed in a box 13 having a door 14. It is preferably a piston and cylinder device, but another equivalent may be used. As illustrated, it has a cylinder 15 and a piston 16, the expansible and contractible chamber in front of the piston being termed an operating chamber. Broadly speaking, this is representative of a source of abnormal fluid pressure. The piston is advanced, to expel liquid from the chamber, by a hand lever 17 acting on a rod 18. The rod is preferably connected to a piston-like member 19, between which and the main piston is a compression spring 20, which acts as a yielding thrust connection, adapted to prevent rupture of any one of the bellows devices 10. A detent 21 may engage a collar on the rear end of the rod 18 to hold the piston assembly in the pressure position, and this detent may be released by the door 14 when such door is closed.

Figure 2:
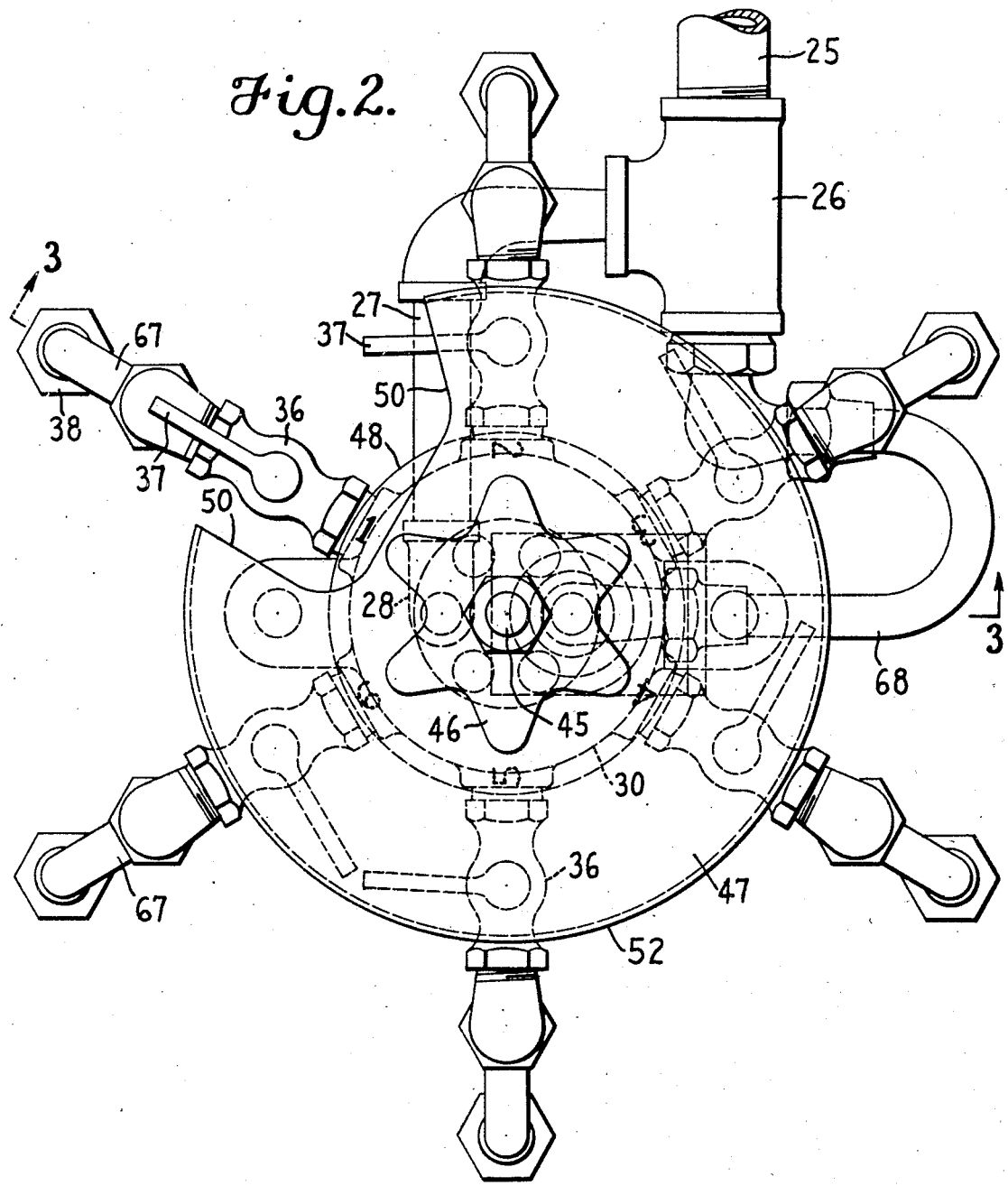
Fig. 2 is a rear elevation of the selective part of the control system.

The front of the cylinder 15 has an outlet and return connection 25. The novel mechanism from this point on will be described in the concrete detail of the preferred embodiment, but it will be understood that many changes may be made, within the scope of the claimed invention. The nipple 25 is connected with a T 26 (Fig. 2). Piping 27 connects this T with a T 28 (Fig. 3). One branch of the T 28 is connected by a nipple 29 with a circular manifold or box 30, made in a casting. The other branch of the T 28 connects, through a nipple 31, with a hollow circular casting or manifold 35.

Connected radially with the manifold chamber 30 are six manually operable control valves 36 (or other number, corresponding to the number of subject valves 9). These valves are preferably turncocks having angle handles 37. It will be convenient to speak of six control valves 36 and lines 11, since that is the illustration. Fig. 3 shows only one control valve and the connections therefrom to its control line, since to make a complete, multiple showing in this view would be confusing.

Each control valve 36 is connected by a tube 67 with a T 38, which in turn is connected with the corresponding control line 11 passing to one of the hydraulic valves which is to be controlled, which in this instance is one of the tank valves 9.

The T's 38 are likewise connected with the manifold 35, by connections 39 containing automatic check-valves 40. These valves close under fluid pressure from the operator 12, and open to flow or return of operating liquid in the direction from the hydraulic valves 9, 10 to the operator. It will be understood that there are as many of the valved connections 39, 40 as there are subject valves 9, 10 to be operated.

It will be seen that the matters thus far discussed are similar in principle to the organization disclosed in my application Serial No. 563,796, filed September 19, 1931, and that the simplification of my application Serial No. 575,223, filed November 16, 1931, is equally applicable, in which event various of the parts concretely illustrated herein might be omitted and their functions be combined with the functions of other parts.

A tube 67 connects the T 26 with a metal bellows or its equivalent 42. This pressure-responsive device is actuated whenever abnormal fluid pressure is exerted by or communicated from the source 12. Its function can best be explained later on.

A rod 45 is pinned to the center of the manifold casting 30. On this pin can turn a selector knob 46 having a circular shutter 47 fixed to it. Beneath the shutter and held by the rod 45, not to turn, is an indicator disc 48, marked with designation numerals 1–6 at regular intervals.

The shutter has a cut-out 50 of a form and dimensions to expose one control valve 36, or its handle, at a time, while obstructing or preventing access to all the others.

The shutter 47 has a peripheral flange 52 which encircles the handles of the control valves, guarding them. This flange also has another function, which will be described and which may be performed by a specifically different provision.

The hub 55 of the selector knob 46 has a circular series of recesses 56, so arranged that, when the shutter is in or near any one of its selecting positions, a locking pin 57 can enter one of the recesses. The locking pin is retracted by a spring 58, and is alined with the fluid-pressure device 42 so as to be projected by that device to lock the selector shutter in any one of its positions, when abnormal fluid pressure produced by or emanating from the source 12 is acting to hold a subject valve 9 open.

Consequently, as long as a tank valve is open the selector shutter can not be turned to permit another of the control valves 36 to be operated to cause the opening of another of the subject valves 9.

If the attendant wishes to select and open another valve 9, he must release or retract the operator 12, whereupon the device 42 will retract, allowing the lock 57 to retract, and permitting the shutter 47 to be turned to a new position.

If the attendant neglects to shut off the formerly open control valve 36 before thus turning the shutter, he can not select and open another valve while the former valve remains open, since the projection of the flange 52 will strike the handle of the open cock 36 and close it.

If the attendant closed one of the control valves 36 while the corresponding subject valve 9 was open, liquid might be trapped between the control valve and the subject valve holding that valve open. He might then release the operator 12 and withdraw the operating liquid from the device 42, making it possible to turn the selector shutter 47 to another position, after which another tank valve might be opened. In other words, two or more tank compartments might be in unloading condition at the same time. This is guarded against by the present invention.

When any one of the control valves 36 is closed and the operator 12 is released or retracted, the oil or other control fluid will return from the valve 9 through the corresponding check valve 40 and manifold 35, eventually to the operator, allowing the valve 9 to close.

It will be evident to those skilled in the art that numerous changes may be made in the construction without departing from the scope of the invention.

I claim:

1. Apparatus for selectively operating any one of a plurality of hydraulic valves, comprising the combination with an operator having an operating chamber from and to which liquid is expelled and returned, of a manifold connected with said operating chamber, a plurality of hydraulic lines connected one with each of said hydraulic valves and all connected with said manifold, manually operable control valves in said lines, said control valves grouped about a center, and a rotary selector shutter constructed and arranged to obstruct access to all but one of the control valves.

2. Apparatus for selectively operating any one of a plurality of hydraulic valves, comprising the combination with an operator having an operating chamber from and to which liquid is expelled and returned, of a manifold connected with said operating chamber, a plurality of hydraulic lines connected one with each of said hydraulic valves and all connected with said manifold, manually operable control valves in said lines, said control valves grouped about a center, a rotary selector shutter constructed and arranged to obstruct access to all but one of the control valves, and means whereby turning of the shutter to a new position will bring about the closing of the control valve that was exposed.

3. Apparatus for selectively operating any one of a plurality of hydraulic valves, comprising the combination with an operator having an operating chamber from and to which liquid is expelled and returned, of a manifold connected with said operating chamber, a plurality of hydraulic lines connected one with each of said hydraulic valves and all connected with said manifold, manually operable control valves in said lines, said control valves grouped about a center, a rotary selector shutter constructed and arranged to obstruct access to all but one of the control valves, said shutter having an opening affording access to the control valves one at a time, and a flange surrounding the valves and arranged to act positively on any valve that may be left open, so as to close it when the shutter is turned to a new position.

4. The combination of a plurality of valves to be operated, fluid-pressure actuated devices operatively related to said valves, a plurality of lines connected one with each of said devices, manually operable control valves in said lines, said control valves grouped about a center, and a rotary shutter constructed and arranged to cover all but one of the control valves, said shutter having an opening adapted to expose one of said control valves at a time.

5. The combination of a plurality of valves to be operated, fluid-pressure actuated devices operatively related to said valves, a plurality of control lines connected one with each of said devices, manually operable control valves in said lines, said control valves grouped about a center, a rotary shutter constructed and arranged to obstruct access to all but one of the control valves, and means in connection with said shutter capable of changing the condition of the control valve that was exposed, when the shutter is turned to a new position.

6. Apparatus for selectively operating any one of a plurality of hydraulic valves, comprising the combination with an operator having an operating chamber from and to which liquid is expelled and returned, of a manifold connected with the operator chamber, a plurality of hydraulic lines connected one with each of said hydraulic valves and all connected with said manifold, control valves in said lines, manual devices for opening said control valves, a selector shutter constructed and arranged to obstruct access to all but one of the control valves, a positive lock for said shutter, and pressure responsive means for actuating said lock and keeping it locked until the hydraulic pressure is relieved by restoration of said operator to its normal condition.

7. Apparatus for selectively operating any one of a plurality of hydraulic valves, comprising the combination with an operator having an operating chamber from and to which liquid is expelled and returned, of a manifold connected with the operator chamber, a plurality of hydraulic lines connected one with each of said hydraulic valves and all connected with said manifold, control valves in said lines, manual devices for opening said control valves, a selector shutter constructed and arranged to obstruct access to all but one of the control valves, a positive lock for said shutter, pressure responsive means for actuating said lock and keeping it locked until the hydraulic pressure is relieved by restoration of said operator to its normal condition, and means enabling liquid to return from any of said hydraulic lines toward the operator, irrespective of the condition of the manual device of the corresponding control valve, when the operator is restored to its normal condition.

8. Apparatus for selectively operating any one of a plurality of hydraulic valves, comprising the combination with an operator having an operating chamber from and to which liquid is expelled or returned, of a manifold connected with the operator chamber, a plurality of hydraulic lines connected one with each of said hydraulic valves and all connected with said manifold, control valves in said lines, manual devices for opening said control valves, a selector shutter constructed and arranged to obstruct access to all but one of the control valves, and means enabling liquid to return from any of said hydraulic lines toward the operator, irrespective of the condition of the manual device of the corresponding control valve, when the operator is restored to its normal condition.

9. Apparatus for selectively operating any one of a plurality of hydraulic valves, comprising the combination with an operator having an operating chamber to and from which liquid is expelled and returned, of a manifold connected with said operating chamber, a plurality of hydraulic lines connected one with each of said hydraulic valves and all connected with said manifold, manually operable control valves in said lines, a second manifold also connected with said operating chamber, and check-valve connections between said lines and this second manifold in by-pass relation to said control valves, and a selector shutter adapted to obstruct access to all but one of the control valves.

10. Apparatus for selectively operating any one of a plurality of hydraulic valves, comprising the combination with an operator having an operating chamber to and from which liquid is expelled and returned, of a manifold connected with said operating chamber, a plurality of hydraulic lines connected one with each of said hydraulic valves and all connected with said manifold, manually operable control valves in said lines, a second manifold also connected with said operating chamber, and check valve connections between said lines and said second manifold in by-pass relation to said control valves, a selector shutter adapted to obstruct access to all but one of the control valves, a positive lock for said shutter, and pressure responsive means for actuating said lock and keeping it locked until the hydraulic pressure is relieved by restoration of said operator to its normal condition.

11. Apparatus for selectively operating any one of a plurality of hydraulic valves, comprising the combination with an operator having an operating chamber to and from which liquid is expelled and returned, of a manifold connected with said operating chamber, a plurality of hydraulic lines connected one with each of said hydraulic valves and all connected with said manifold, manually operable control valves in said lines, check valve connections interposed between said lines and said operating chamber in by-pass relation to said control valves, a selector shutter adapted to obstruct access to all but one of said control valves, a positive lock for said shutter, pressure responsive means for actuating said lock and keeping it locked until the hydraulic pressure is relieved by restoration of said operator to its normal condition, and means whereby moving the shutter from one selecting position to another will bring about the closing of the control valve that was open.

12. Apparatus for selectively operating any one of a plurality of hydraulic valves, comprising the combination with an operator having an operating chamber from and to which liquid is expelled and returned, of a manifold connected with the operator chamber, a plurality of hydraulic lines connected one with each of said hydraulic valves and all connected with said manifold, control valves in said lines, manual devices for opening said control valves, a selector shutter constructed and arranged to obstruct access to all but one of the control valves, a positive lock for said shutter, pressure responsive means for actuating said lock and keeping it locked until the hydraulic pressure is relieved by restoration of said operator to its normal condition, means enabling liquid to return from any of said hydraulic lines toward the operator, irrespective of the condition of the manual device of the corresponding control valve, when the operator is restored to its normal condition, and means in connection with said shutter capable of closing the last exposed control valve when the shutter is moved to another selecting position.

13. The combination with a plurality of valves to be operated selectively and fluid-operated devices associated with said valves, of control lines connected with said devices, manually operable control valves in said lines, said control valves grouped about a center, a rotary selector shutter constructed and arranged to permit only one of said control valves to be operated at a time, means for producing an abnormal pressure condition in any of the control lines when its control valve is operated, and means controlled by the abnormal pressure condition for automatically locking said shutter.

PAUL S. SHIELD.